United States Patent [19]

Lee

[11] Patent Number: 5,581,308
[45] Date of Patent: Dec. 3, 1996

[54] METHOD AND APPARATUS FOR DETERMINING TRUE MOTION VECTORS FOR SELECTED PIXELS

[75] Inventor: Min-Sub Lee, Seoul, Rep. of Korea

[73] Assignee: Daewoo Electronics Co., Ltd., Seoul, Rep. of Korea

[21] Appl. No.: 446,351

[22] Filed: May 22, 1995

[30] Foreign Application Priority Data

Mar. 18, 1995 [KR] Rep. of Korea .......................... 95-5713

[51] Int. Cl.$^6$ ...................................................... H04N 7/12
[52] U.S. Cl. ........................... 348/699; 348/416; 348/413; 348/407
[58] Field of Search .................................... 348/699, 416, 348/411; 382/243, 241, 240

[56] References Cited

U.S. PATENT DOCUMENTS

| | | | |
|---|---|---|---|
| 5,048,112 | 9/1991 | Alves et al. | 382/243 |
| 5,247,586 | 9/1993 | Gobert et al. | 348/699 |
| 5,295,201 | 3/1994 | Yokohama | 382/241 |
| 5,398,068 | 3/1995 | Liu et al. | 348/416 |
| 5,453,800 | 9/1995 | Kondo et al. | 348/699 |
| 5,479,218 | 12/1995 | Etoh | 348/699 |

*Primary Examiner*—Tommy P. Chin
*Assistant Examiner*—Anand Rao
*Attorney, Agent, or Firm*—Anderson, Kill & Olick P.C.

[57] ABSTRACT

An inventive apparatus determines true motion vectors between a current and its previous frames for feature points selected from the previous frame wherein a selected feature point is surrounded by its neighboring four feature points to form a previous rhombus having a set of four triangles based on the selected feature point. A motion vector displacement generator gives a predetermined N number of displacements to an initial motion vector for its corresponding feature points to thereby produce a subset of N candidate motion vectors and a motion prediction block provides a current rhombus corresponding to the previous rhombus by the initial motion vectors, wherein the current rhombus has N sets of four triangles due to the N candidate motion vectors. A true motion vector is selected from the subset of N candidate motion vectors, which entails a minimum error value between the predicted pixel values for each triangle set in the current rhombus and their respective corresponding current pixel values from the previous frame.

6 Claims, 4 Drawing Sheets

METHOD AND APPARATUS FOR DETERMINING TRUE MOTION VECTORS FOR SELECTED PIXELS

FIELD OF THE INVENTION

The present invention relates to an apparatus for encoding a video signal; and, more particularly, to a method and apparatus for determining true motion vectors between a current and a previous frames for selected pixels.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12 (December 1985); and in Ninomiya and Ohtsuka, "A Motion-Compensated Interframe Coding Scheme for Television Pictures", *IEEE Transactions on Communications*, COM-30, No. 1 (January 1982).

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been many approaches to estimate the displacement of pixels of an object. One of the motion estimation techniques comprises a pixel-by-pixel motion estimation using feature points, wherein each of the feature points is defined as a position of a pixel capable of representing its neighboring pixels. In the motion estimation technique utilizing the feature points, a number of feature points are first selected from all of the pixels contained in the previous frame. Then, motion vectors for the selected feature points are determined by employing a block matching algorithm, wherein each of the motion vectors represents a spatial displacement between one feature point in the previous frame and a corresponding matching point, i.e., a most similar pixel, in the current frame. Specifically, the matching point for each of the feature points is searched in a search region within the current frame, wherein the search region is defined as a region with a predetermined area which encloses the position of its corresponding feature point. However, in the pixel-by-pixel motion estimation, it is not easy to estimate the true motion of, e.g., a feature point, if all pixels in the block do not move in a same way.

SUMMARY OF THE INVENTION

It is, therefore, a primary object of the present invention to provide an improved apparatus for determining true motion vectors for selected pixels.

In accordance with a preferred embodiment of the present invention, there is provided a method for determining true motion vectors between a current and a previous frames for selected pixels, i.e., feature points, each of the feature points being defined in terms of a position of a pixel located at a node of a rectangular grid mapped on the previous frame, the method comprising the steps of: (a) assigning each of the feature points as a subject feature point in sequence, wherein the subject feature point is surrounded by its neighboring four feature points, which are not assigned as subject feature points for the time being, to thereby define a previous rhombus, the previous rhombus having a set of four triangles, each of the triangles being formed by connecting the subject feature point and two of its neighboring feature points; (b) detecting a first set of initial motion vectors for the feature points between the current frame and the previous frame; (c) providing a predetermined N number of displacements to each of the initial motion vectors for its corresponding subject feature point to thereby produce a subset of N candidate motion vectors; (d) defining a current rhombus on the current frame corresponding to each previous rhombus in the previous frame through the use of the first set of motion vectors; (e) generating N sets of four triangles in each current rhombus based on the N candidate motion vectors; (f) deriving a predicted pixel from the previous frame for each pixel contained in each set of four triangles within the current rhombus to provide a predicted pixel value therefor; (g) producing a differential pixel value for said each pixel contained in each set of four triangles by subtracting the predicted pixel value from the pixel value of said each pixel; (h) calculating N error values for said N sets of triangles in each current rhombus by averaging the differential pixel values corresponding thereto; (i) comparing said N error values to select an error value which entails a minimum error; and (j) choosing a motion vector, which corresponds to the selected minimum error value, from each subset of N candidate motion vectors as a true motion vector.

In accordance with another embodiment of the present invention, there is provided an apparatus for determining true motion vectors between a current and a previous frames for feature points, each of the feature points being defined in terms of a position of a pixel located at a node of a rectangular grid mapped on the previous frame, which comprises: means for sequentially assigning each of the feature points as a subject feature point, wherein the subject feature point is surrounded by its neighboring four feature points, which are not assigned as subject feature points right now, to thereby define a previous rhombus, the previous rhombus having a set of four triangle regions, each of the triangles being formed by connecting the subject feature point and its two neighboring feature points; means for detecting a first set of initial motion vectors for the feature points between the current frame and the previous frame; means for providing a predetermined N number of displacements to each of the initial motion vectors for its corresponding subject feature point to thereby produce a subset of N candidate motion vectors; means for defining a current rhombus on the current frame corresponding to each previous rhombus in the previous frame through the use of the first set of motion vectors; means for generating N sets of four triangles in each current rhombus based on the N candidate motion vectors; means for deriving a predicted pixel from the previous frame for each pixel contained in each set of four triangles within the current rhombus to provide a predicted pixel value therefor; means for producing a differential pixel value for said each pixel contained in each set of four triangles by subtracting the predicted pixel value from the pixel value of said each pixel; means for calculating N error values for said N sets of triangles by averaging the differential pixel values corresponding thereto; means for comparing said N error values to select an error value which entails a minimum error; and means for choosing a motion vector, which corresponds to the selected minimum error value, from each subset of N candidate motion vectors as a true motion vector.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
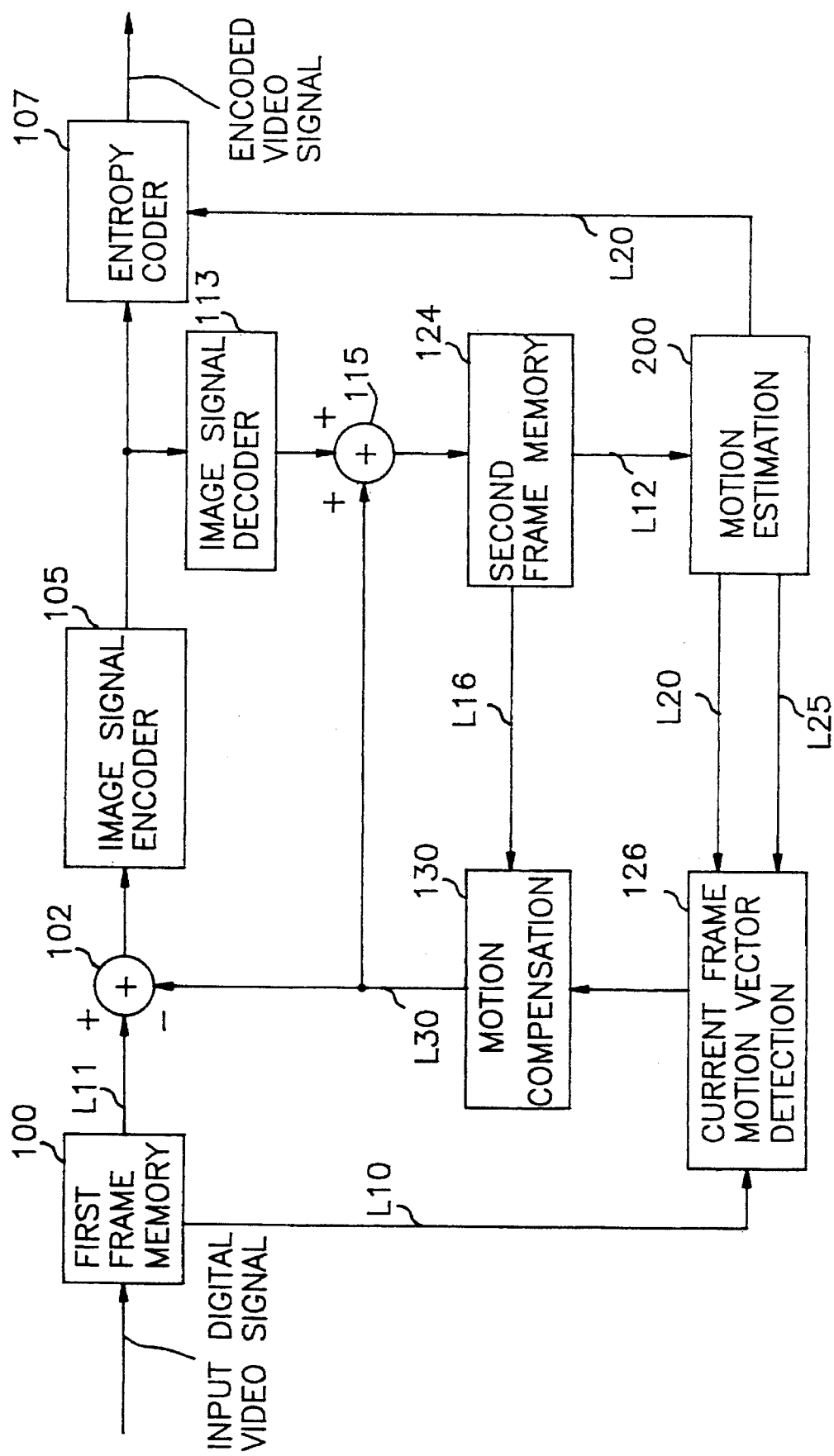
FIG. 1 is a block diagram of a video encoder that employs a motion estimation apparatus of the present invention.

Referring to FIG. 1, there is shown a block diagram of a video signal encoding system which employs a motion estimation block 200 of the present invention. An input digital video signal is fed to a first frame memory 100 for the storage thereof.

At the motion estimation block 200, a current frame signal on a line L10 retrieved from the first frame memory 100 and a reconstructed previous frame signal on a line L12 from a second frame memory 124 are processed to determine a first set of true motion vectors for selected pixels, i.e., a number of feature points in the previous frame. Details of the motion estimation block 200 will be described with reference to FIG. 2. The motion vectors from the motion estimation block 200 are applied to a current frame motion vector detection block 140 and an entropy coder 107 through a line L20 and position data for the feature points is fed to the current frame motion vector detection block 140 through a line L25.

At the current frame motion vector detection block 140, a second set of motion vectors for all of the pixels in the current frame is determined through the use of the first set of true motion vectors and the position data from the motion estimation block 200. In order to determine the second set of motion vectors, quasi-feature points are determined first, wherein the quasi feature points represent the pixels of the current frame shifted from the feature points of the previous frame by the first set of motion vectors. After determining the quasi feature points, motion vectors for non-feature points, which are the remaining pixel points in the current frame, are determined as follows.

First of all, a plurality of non-overlapping polygons, e.g., triangles, are defined by line segments connecting the quasi-feature points. And then, a predicted position on the previous frame for each pixel contained in each polygon of the current frame is determined based on positional relationships between the quasi-feature points forming said each polygon and their corresponding feature points. Thereafter, a predicted pixel value is obtained from the previous frame for said each pixel based on the predicted position; and then a motion vector for said each of the pixels in the current frame is determined from a displacement between the pixel and its prediction. The determined second set of motion vectors is provided to a motion compensation block 130 to predict the current frame on a pixel-by-pixel basis.

The motion compensation block 130 retrieves each value of the pixels to be contained in a predicted current frame from the second frame memory 124 by using each of the motion vectors contained in the second set, thereby providing the predicted current frame signal to a subtractor 102 and an adder 115 via a line L30.

The predicted current frame signal on the line L30 is subtracted from the current frame signal on the line L11 at the subtractor 102; and the resultant data, i.e., a frame difference signal denoting differential pixel values between the current frame and the predicted current frame, is dispatched to an image signal encoder 105, wherein a frame difference signal is encoded into a set of quantized transform coefficients, e.g., by using a discrete cosine transform (DCT) and any of the known quantization methods.

Thereafter, the quantized transform coefficients are transmitted to the entropy coder 107 and an image signal decoder 113. At the entropy coder 107, the quantized transform coefficients from the image signal encoder 105 and the first set of motion vectors supplied through the line L20 are coded together by using, e.g., a combination of run-length and variable length coding techniques for the transmission thereof. In the meantime, the image signal decoder 113 converts the quantized transform coefficients from the image signal encoder 105 back into a reconstructed frame difference signal by employing an inverse quantization and an inverse DCT.

The reconstructed frame difference signal from the image signal decoder 113 and the predicted current frame signal from the motion compensation block 130 are combined at the adder 115 to thereby provide a reconstructed current frame signal to be written as a previous frame onto the second frame memory 124.

Detailed description of the video signal encoding system as set forth above excepting the inventive motion estimation block 200 is disclosed in a commonly owned application, U.S. Ser. No. 08/434,808, filed on May 4, 1995 entitled "METHOD AND APPARATUS FOR ENCODING/DECODING A VIDEO SIGNAL", which is incorporated herein by reference.

Another example of the video signal encoding apparatus which is adapted to determine the motion vectors for the non-quasi-feature points is disclosed in a commonly owned application, U.S. Ser. No. 08/367,520, filed on Dec. 30, 1994, entitled "METHOD AND APPARATUS FOR ENCODING A VIDEO SIGNAL USING PIXEL-BY- PIXEL MOTION PREDICTION", which is also incorporated herein by reference. In the video signal encoding apparatus, a motion vector for a pixel position of the non-quasi-feature points is determined by averaging the quasi-feature points which are placed within a circle boundary having a radius defined by the summation of the distance to the nearest quasi-feature point from the pixel position and a predetermined expanded radius for including other feature point to be used in calculating the motion vector.

Figure 2:
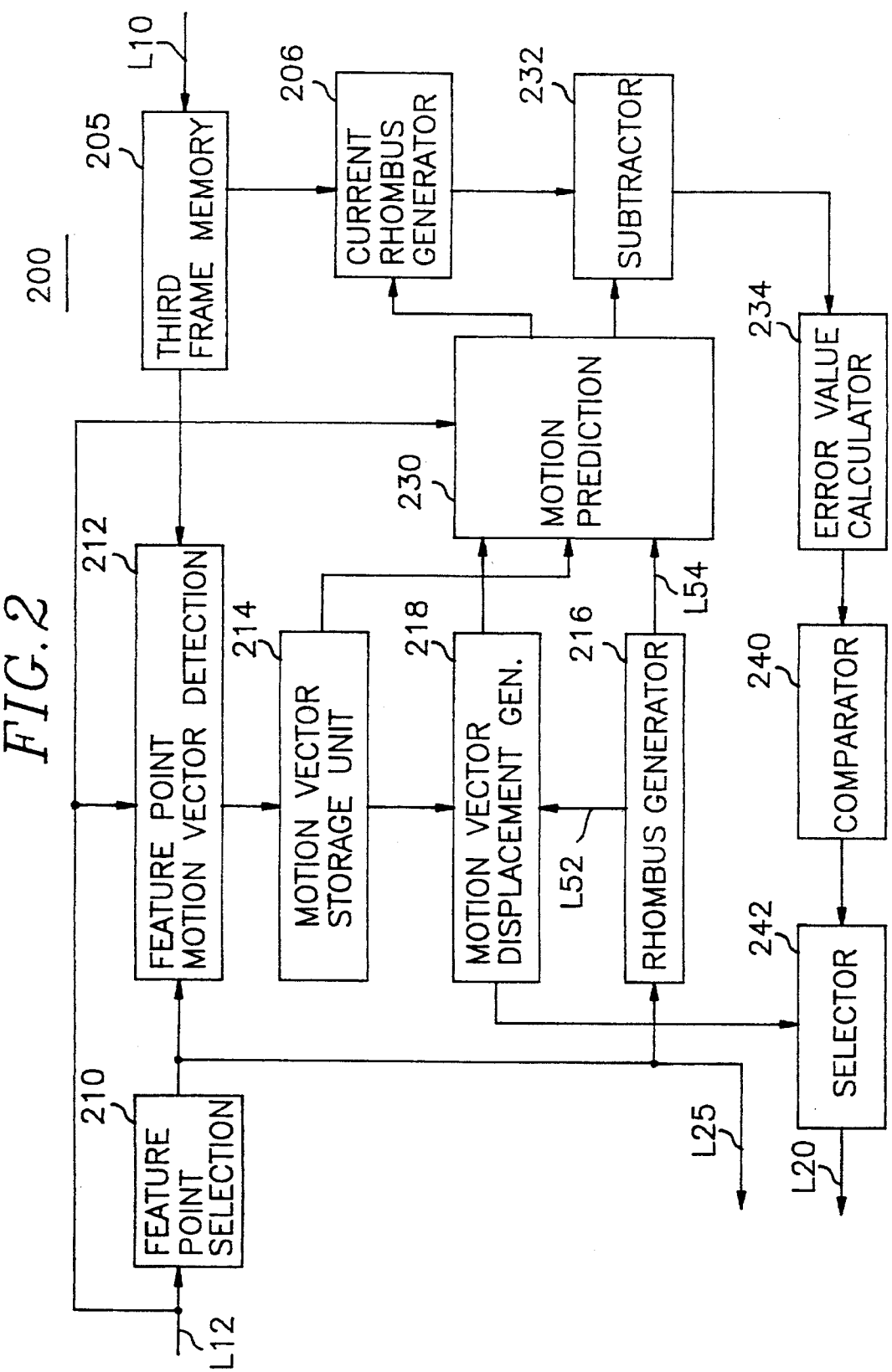
FIG. 2 represents a detailed block diagram of the motion estimation apparatus of the present invention.

Referring now to FIG. 2, there is shown a detailed block diagram of the motion estimation block 200 of the present invention shown in FIG. 1.

As shown in FIG. 2, the previous frame signal on the line L12 from the second frame memory 124 is inputted to a feature point selection block 210, a feature point motion vector detection block 212 and a motion prediction block 230. And the current frame signal on the line L10 is provided to a third frame memory 205.

Figure 3:
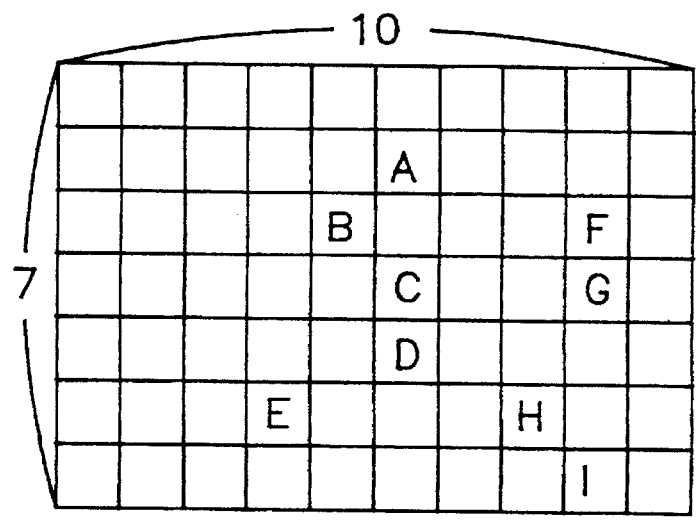
FIG. 3 describes an exemplary frame to define feature points.

At the feature point selection block 210, a number of feature points are selected among the pixels contained in the previous frame. Each of the feature points is defined as a position of a pixel which is capable of representing the motion of an object in the frame. Referring to FIG. 3, there is shown an exemplary frame of 10×7 pixels. If a moving object exists around the center of the frame and the motion of the moving object is successfully represented by a set of pixels "A" to "I", these pixels are selected as the feature points of the frame.

Figure 4:
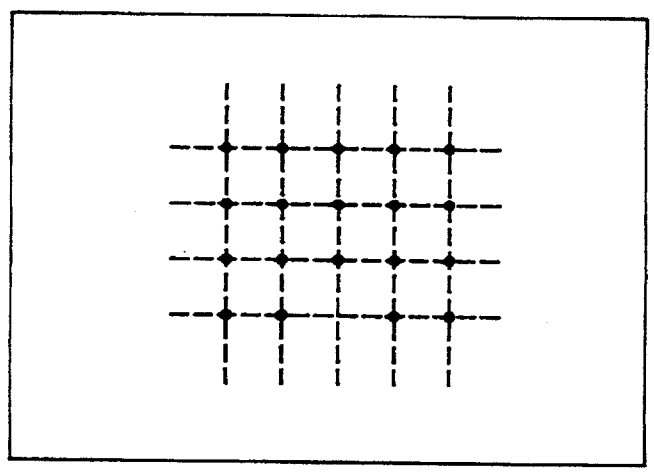
FIG. 4 illustrates a rectangular grid mapped on the previous frame used to select feature points in accordance with a preferred embodiment of the invention.

In a preferred embodiment of the present invention, the feature points are determined by a grid technique employing a rectangular grid as shown in FIG. 4. As shown therein, the feature points are located at the nodes of the grid.

Referring back to FIG. 2, position data of the selected feature points from the feature point selection block 210 is supplied to the current frame motion vector detection block 140 through a line L25 shown in FIG. 1 and is also inputted to the feature point motion vector detection block 212 and a rhombus generator 216 for the storage thereof.

Figure 5:
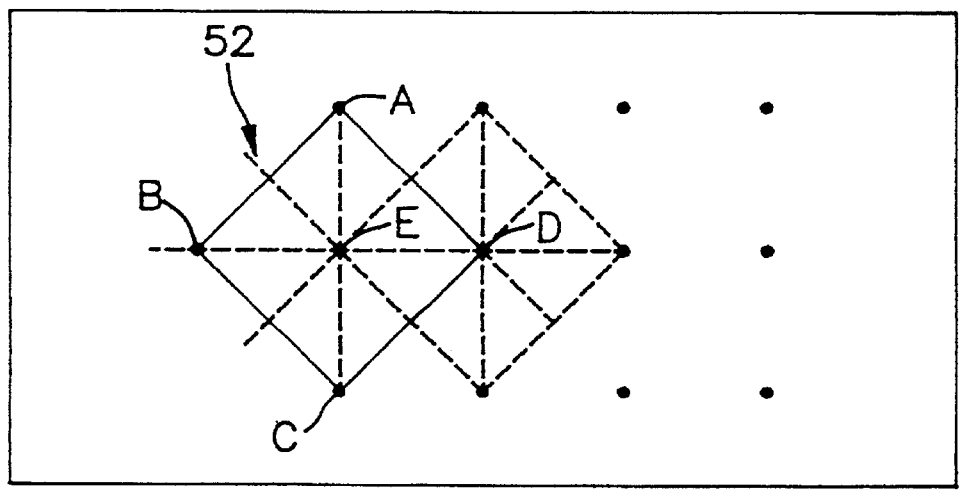
FIGS. 5 and 6 depict the formation of rhombus frames in a previous and a current frame, respectively.

The rhombus generator 216 sequentially assigns each of the feature points as a subject feature point. As illustrated in FIG. 5, a subject feature point, e.g., "E", is surrounded by its neighboring four feature points A,B,C,D, which are not selected as the subject feature point at the moment, to thereby form a previous rhombus, e.g., 52, with the subject point E at its center having a set of four triangle regions ABE, BCE, CDE and DAE. Information for each of the subject feature points, e.g., E, is fed to a motion vector displacement generator 218 through a line L52, while information for the subject feature point and its neighboring feature points, e.g., A,B,C,D which form the previous rhombus is dispatched to the motion prediction block 230 via a line L54.

At the feature point motion vector detection block 212, a first set of initial motion vectors for the feature points is detected based on the current frame signal stored in the third frame memory 205 and the position data of the feature points from the feature point selection block 210. Each of the initial motion vectors of the first set represents a spatial displacement between a feature point in the previous frame and a most similar pixel thereto in the current frame. There are numerous processing algorithms available for use to detect the motion vectors on a pixel-by-pixel basis. In the preferred embodiments of the invention, there is used a block matching algorithm: that is, when the position data of a feature point is received from the feature point selection block 210, a feature point block of, e.g., 5×5, pixels of the previous frame having the feature point at the center thereof is retrieved via the line L12 from the second frame memory 124 shown in FIG. 1. Thereafter, an initial motion vector for the feature point block is determined after a similarity calculation by using an error function, e.g., MAE(mean absolute error) or MSE(mean square error), between the feature point block and each of a plurality of equal-sized candidate blocks included in a generally larger search region, e.g., 10×10 pixels, of the current frame retrieved from the first frame memory 100 shown in FIG. 1, wherein the motion vector is a displacement between the feature point blocks and a candidate block which yields a minimum error function. The determined motion vector is set to a motion vector of the feature point.

After detecting the initial motion vectors for all of the feature points, the first set of initial motion vectors is supplied to a motion vector storage unit 214 for the storage thereof. The initial motion vectors stored in the motion vector storage unit 214 are sequentially provided to the motion vector displacement generator 218 and the motion prediction block 230.

The motion vector displacement generator 218 gives a predetermined number N of displacements to the initial motion vector corresponding to each of the subject feature points assigned by the rhombus generator 216, to thereby produce a subset of N candidate motion vectors per one initial motion vector. In accordance with the present invention, the displacement is preferably set to from (0, 0) to (±2, ±2) pixels in the horizontal and vertical directions with respect to each initial motion vector. Accordingly, said N equals to 25 in this instance. The subset of N candidate motion vectors is provided to a selection circuit 242 and the motion prediction block 230.

Figure 6:
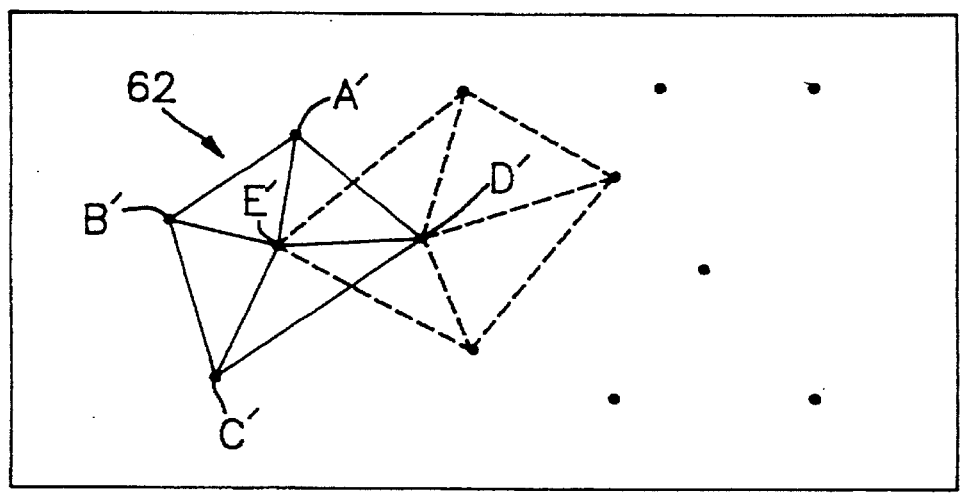

The motion prediction block 230 generates a current rhombus corresponding to each previous rhombus to derive predicted values for the pixels contained in the current rhombus from the previous frame. In order to generate the current rhombus, motion vectors for four vertexes forming the previous rhombus is retrieved from the motion vector storage unit 214 and quasi-feature points, e.g., A', B', C' and D', which represent the pixels of the current frame shifted from the four feature points, i.e., four vertexes, A, B, C and D on the previous rhombus by their corresponding motion vectors are determined. After determining the quasi-feature points, the current rhombus, e.g., 62 shown in FIG. 6, is defined by connecting the four quasi-feature points A', B', C' and D'. In this connection, information on the generation of the current rhombus is provided to a current rhombus generation block 206.

And then, a subset of N subject quasi-feature points, which represents the pixels produced in the current rhombus by the subset of N candidate motion vectors for the subject feature point in the previous rhombus, are determined. After determining the quasi-feature points and the N subject quasi-feature points, a set of four triangles is defined for each of the N subject quasi-feature points by connecting said each of the N subject quasi-feature points and its neighboring two quasi-feature points. In FIG. 6, there is exemplarily illustrated the process of generating of a current rhombus, e.g., 62, by connecting the four quasi-feature points, A', B', C' and D'. The current rhombus has a subject quasi-feature point E' to thereby form a set of four triangles A'B'E', B'C'E', C'D'E' and D'A'E', which corresponds to, e.g., the previous rhombus 52 shown in FIG. 5. Although it is not specifically shown therein, each current rhombus will have N sets of four triangles due to the N candidate motion vectors derived from the feature point E in the previous rhombus.

Thereafter, prediction of pixels within the current rhombus 62 is carried out for each of the N subject quasi-feature points by using an affine transformation technique. As well known in the art, an arbitrary sequence of rotation, translation and scale changes of a moving object can be represented by the affine transformation.

Assuming, as shown in FIGS. 5 and 6, that three pixels, i.e., two vertexes A', B' and one of the subject feature-points, E', in the current frame are determined as quasi-feature points corresponding to their respective feature points A, B and E in the previous rhombus, pixels in a triangle A'B'E' of the current rhombus are correlated to those in a triangle ABE of the previous rhombus by the affine transformation defined as:

$$\begin{bmatrix} x' \\ y' \end{bmatrix} = \begin{bmatrix} a & b \\ c & d \end{bmatrix} \cdot \begin{bmatrix} x \\ y \end{bmatrix} + \begin{bmatrix} e \\ f \end{bmatrix}$$

wherein (x, y) represents the x and y coordinates of a pixel within the current rhombus and (x', y'), the coordinates of a predicted pixel position on the previous rhombus; and a, b, c, d, e and f are affine transformation coefficients.

The six affine transform coefficients are calculated by solving six linear equations obtained from three sets of related feature and quasi-feature points, i.e., A–A', B–B' and E–E'. Once the affine transform coefficients are known, each of the remaining pixels in the triangle A'B'E' can be mapped onto a position in the triangle ABE through the use of the affine transformation equation. In this manner, pixels in each triangle included in the current rhombus 62 are predicted on the previous rhombus. Pixels on the boundary of two contiguous triangles can be predicted from either one of the two triangles. Each of the values for the predicted pixels, corresponding to each set of four triangles, is retrieved from the second frame memory 124 and supplied to a subtractor 232. The process of predicting the pixels in the current rhombus is repeated for all the N sets of four triangles.

In the meantime, the current rhombus generator 206 provides the subtractor 232 with pixel values for each current rhombus from the third frame memory 205 in response to the current rhombus information provided by the motion prediction block 230.

The subtractor 232 then calculates differential pixel values for each set of the four triangles of the current rhombus by subtracting the predicted pixel values provided by the motion prediction block 230 from the pixel values for each current rhombus.

The error value calculator 234 calculates an error value for each set of four triangles of a current rhombus by averaging the differential pixel values corresponding thereto to produce a set of N error values per each of the predicted current rhombuses. Each set of N error values is then provided to a comparator 240.

The comparator 240 compares N error values in each set to select an error value from each set, which entails a minimum error. Based on the comparison, the comparator 240 generates for each current rhombus a selection signal indicating the minimum error value, which is then applied to the selector 242. The selector 242, in response to the selection signal from the comparator 240, chooses a motion vector, which corresponds to the selected error value, from each subset of N candidate motion vectors from the motion displacement generator 218 as a true motion vector for each of the assigned feature points. Each of the true motion vectors for each of the feature points is then provided to the current frame motion vector detection block 140 on the line L20 shown in FIG. 1.

While the present invention has been described with respect to the particular embodiments, it will be apparent to those skilled in the art that various changes and modifications may be made without departing from the spirit and scope of the invention as defined in the following claims.

What is claimed is:

1. A method for determining true motion vectors between a current and a previous frames for feature points, each of the feature points being defined in terms of a position of a pixel located at a node of a rectangular grid mapped on the previous frame, the method comprising the steps of:

(a) assigning each of the feature points as a subject feature point in sequence, wherein the subject feature point is surrounded by its neighboring four feature points, to thereby define a previous rhombus, the previous rhombus having a set of four triangle regions, each of the triangles being formed by connecting the subject feature point and its two neighboring feature points;

(b) detecting a first set of initial motion vectors for the feature points between the current frame and the previous frame;

(c) providing a predetermined N number of displacements to each of the initial motion vectors for its corresponding subject feature point to thereby produce a subset of N candidate motion vectors;

(d) defining a current rhombus in the current frame corresponding to each previous rhombus through the use of the first set of initial motion vectors;

(e) generating N sets of four triangles in each current rhombus based on the N candidate motion vectors;

(f) deriving a predicted pixel from the previous frame for each pixel contained in each set of four triangles within each current rhombus to provide a predicted pixel value therefor;

(g) producing a differential pixel value for said each pixel contained in each set of four triangles by subtracting the predicted pixel value from the pixel value of said each pixel;

(h) calculating N error values for said N sets of triangles in each current rhombus by averaging the differential pixel values corresponding thereto;

(i) comparing said N error values to select an error value which entails a minimum error; and (j) choosing a motion vector, which corresponds to the selected minimum error value, from each subset of N candidate motion vectors as a true motion vector.

2. The method of claim 1, wherein the step (d) of defining the current rhombus includes the step of:

determining quasi-feature points in the current frame based on the feature points and the motion vectors thereof, wherein the current rhombus is formed by connecting the quasi-feature points which correspond to the feature points defining the previous rhombus.

3. The method of claim 2, wherein the step (f) of deriving the pixel value includes the steps of:

determining a predicted position on the previous frame for said each pixel based on the positional relationships between the quasi-feature points forming said each triangle and their corresponding feature points; and providing the predicted pixel value for said each pixel based on the predicted position.

4. An apparatus for determining true motion vectors between a current and a previous frames for feature points, each of the feature points being defined in terms of a position of a pixel located at a node of a rectangular grid mapped on the previous frame, which comprises:

means for sequentially assigning each of the feature points as a subject feature point, wherein the subject feature point is surrounded by its neighboring four feature points, to thereby define a previous rhombus, the previous rhombus having a set of four triangle regions, each of the triangles being formed by connecting the subject feature point and its two neighboring feature points;

means for detecting a first set of initial motion vectors for the feature points between the current frame and the previous frame;

means for providing a predetermined N number of displacements to each of the initial motion vectors for its corresponding subject feature point to thereby produce a subset of N candidate motion vectors;

means for defining a current rhombus on the current frame corresponding to each previous rhombus in the previous frame through the use of the first set of initial motion vectors;

means for generating N sets of four triangle regions in each current rhombus based on the N candidate motion vectors;

means for deriving a predicted pixel from the previous frame for each pixel contained in each set of four triangles within each current rhombus to provide a predicted pixel value therefor;

means for producing a differential pixel value for said each pixel contained in each set of four triangles by subtracting the predicted pixel value from the pixel value of said each pixel;

means for calculating N error values for said N sets of triangles in each current rhombus by averaging the differential pixel values corresponding thereto;

means for comparing said N error values to select an error value which entails a minimum error; and means for choosing a motion vector, which corresponds to the selected minimum error value, from each subset of N candidate motion vectors as a true motion vector.

5. The apparatus of claim 4, wherein said current rhombus determining means includes means for determining quasi-feature points in the current frame based on the feature points and the motion vectors thereof, wherein the current rhombus is formed by connecting the quasi-feature points which correspond to the feature points defining the previous rhombus.

6. The apparatus of claim 5, wherein said pixel value driving means includes:

means for determining a predicted position on the previous frame for said each pixel based on positional relationships between the quasi-feature points forming said each triangle and their corresponding feature points; and means for providing the predicted pixel value for said each pixel based on the predicted position.

* * * * *